US011600978B2

(12) United States Patent
Tomita et al.

(10) Patent No.: US 11,600,978 B2
(45) Date of Patent: Mar. 7, 2023

(54) RESIN STRUCTURE AND WIRE HARNESS

(71) Applicant: Yazaki Corporation, Tokyo (JP)

(72) Inventors: Kei Tomita, Makinohara (JP); Kengo Ishida, Makinohara (JP); Yukihiro Koyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/494,516

(22) Filed: Oct. 5, 2021

(65) Prior Publication Data
US 2022/0115850 A1   Apr. 14, 2022

(30) Foreign Application Priority Data

Oct. 12, 2020 (JP) .............................. JP2020-172003

(51) Int. Cl.
*H02G 3/14* (2006.01)
*H02G 3/08* (2006.01)
*B60R 16/02* (2006.01)
*H01B 7/00* (2006.01)
*B60R 16/023* (2006.01)

(52) U.S. Cl.
CPC .......... *H02G 3/088* (2013.01); *B60R 16/0207* (2013.01); *B60R 16/0239* (2013.01); *H01B 7/0045* (2013.01); *H02G 3/14* (2013.01)

(58) Field of Classification Search
CPC ...... H02G 3/088; H02G 3/14; B60R 16/0207; B60R 16/0239; H01B 7/0045
USPC ......................................................... 361/826
See application file for complete search history.

(56) References Cited

U.S. PATENT DOCUMENTS

| 5,531,345 | A | 7/1996 | Nakamura et al. |
| 10,759,359 | B1* | 9/2020 | Komori .............. H01B 7/0045 |
| 2018/0309279 | A1* | 10/2018 | Kakimi ................ H02G 3/088 |
| 2019/0288445 | A1* | 9/2019 | Komori ............ H01R 13/5825 |
| 2020/0176961 | A1* | 6/2020 | Tomita ............... H01B 7/0045 |
| 2020/0269778 | A1* | 8/2020 | Komori .................. H02G 3/32 |

FOREIGN PATENT DOCUMENTS

| JP | 07027237 U | 5/1995 |
| JP | 2013063016 A | 4/2013 |
| JP | 2018-186614 A | 11/2018 |

* cited by examiner

*Primary Examiner* — Timothy J Thompson
*Assistant Examiner* — Michael F McAllister
(74) *Attorney, Agent, or Firm* — Sughrue Mion, PLLC

(57) ABSTRACT

A resin structure has an insertion portion through which an electric wire runs. The resin structure includes a first resin body and a second resin body to be attached to the first resin body in an attaching direction so as to cover the opening portion. The first resin body includes a first wall portion forming a part of a wall portion perpendicular to the attaching direction, and a first insertion portion provided in the first wall portion and forming a part of the insertion portion. The second resin body includes a second wall portion forming another part of the wall portion, and a second insertion portion provided in the second wall portion and forming another portion of the insertion portion. When the first resin body and the second resin body are attached to each other, the insertion portion is disposed in the wall portion of the resin structure.

3 Claims, 8 Drawing Sheets

RESIN STRUCTURE AND WIRE HARNESS

CROSS-REFERENCE TO RELATED APPLICATION

The present application claims priority to Japanese Patent Application No. 2020-172003 filed on Oct. 12, 2020, the entire content of which is incorporated herein by reference.

TECHNICAL FIELD

The present invention relates to a resin structure and a wire harness.

BACKGROUND

A resin structure of related art is formed attaching a plurality of resin bodies to each other, such as an electrical junction box (for example, a relay box) mounted on a vehicle. For example, one of electrical junction boxes of related art includes a main body case that holds electronic components and the like, and a lower cover (or an upper cover) that is attached to a lower portion (or an upper portion) of the main body case (see, for example, JP2018-186614A).

In the electrical junction box of related art, electric wires connected to various electrical components are inserted into and extend inside and outside the electrical junction box, and are routed so as to be electrically connected to electronic components and the like inside the electrical junction box. The electric wire inside the electrical junction box is drawn out to the outside from an insertion portion defined by the lower cover and an additional guide portion attached to a bottom wall of the lower cover.

In the electrical junction box of the related art, the additional guide portion provided separately from the electrical junction box is attached to the bottom wall of the lower cover, so that the electric wire is drawn out in any direction. However, a method described above is not preferable from the viewpoint of cost and workability because the number of components increases due to the use of the additional guide portion. As described above, in the electrical junction box of related art, it is difficult to achieve a reduction in the number of components while keeping a configuration in which the electric wire can be drawn out toward any direction.

SUMMARY

Illustrative aspects of the present invention provide a resin structure with which an electric wire can be drawn out toward any direction while reducing the number of components, and a wire harness using the resin structure.

According to an illustrative aspect of the present invention, a resin structure has an insertion portion configured such that an electric wire runs through the insertion portion to extend inside and outside the resin structure. The resin structure includes a first resin body having a box shape and an opening portion and a second resin body configured to be attached to the first resin body in an attaching direction so as to cover the opening portion. The first resin body includes a first wall portion forming a part of a wall portion perpendicular to the attaching direction, and a first insertion portion provided in the first wall portion and forming a part of the insertion portion. The second resin body includes a second wall portion forming another part of the wall portion, and a second insertion portion provided in the second wall portion and forming another portion of the insertion portion. When the first resin body and the second resin body are attached to each other, the insertion portion is disposed in the wall portion of the resin structure.

According to another illustrative aspect of the present invention, a wire harness includes a resin structure and an electric wire to be inserted into and run through the resin structure. The resin structure includes an insertion portion through which the electric wire runs to extend inside and outside the resin structure, a first resin body having a box shape and an opening portion; and a second resin body configured to be attached to the first resin body in an attaching direction so as to cover the opening portion. The first resin body includes a first wall portion forming a part of a wall portion perpendicular to the attaching direction, and a first insertion portion provided in the first wall portion and forming a part of the insertion portion. The second resin body includes a second wall portion forming another portion of the wall portion, and a second insertion portion provided in the second wall portion and forming another portion of the insertion portion. When the first resin body and the second resin body are attached to each other, the insertion portion is disposed in the wall portion of the resin structure. The electric wire runs through the insertion portion to extend inside and outside the resin structure.

Other aspects and advantages of the invention will be apparent from the following description, the drawings and the claims.

DESCRIPTION OF EMBODIMENTS

Hereinafter, a resin structure 1 according to an embodiment of the present invention shown in FIG. 1 will be described with reference to the drawings. The resin structure 1 is typically a relay box (electrical junction box) that is to be mounted on a vehicle and accommodates electronic components such as a relay.

Figure 1:
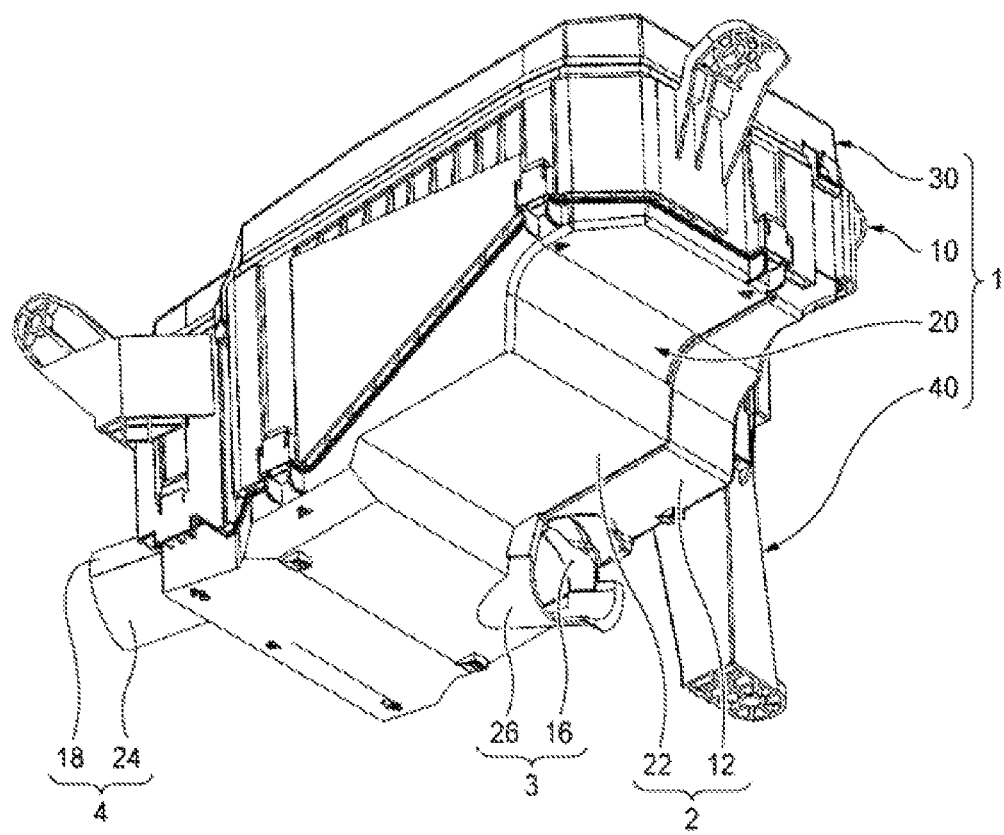
FIG. 1 is a perspective view of a resin structure according to an embodiment of the present invention as viewed from below.
Figure 1:
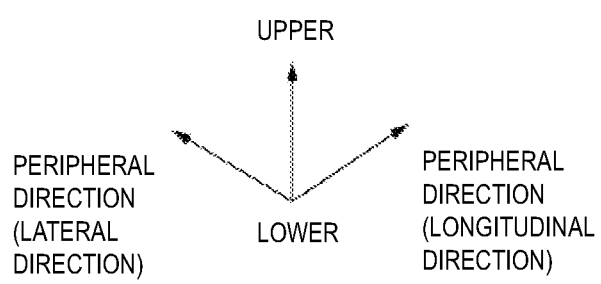
Figure 2:
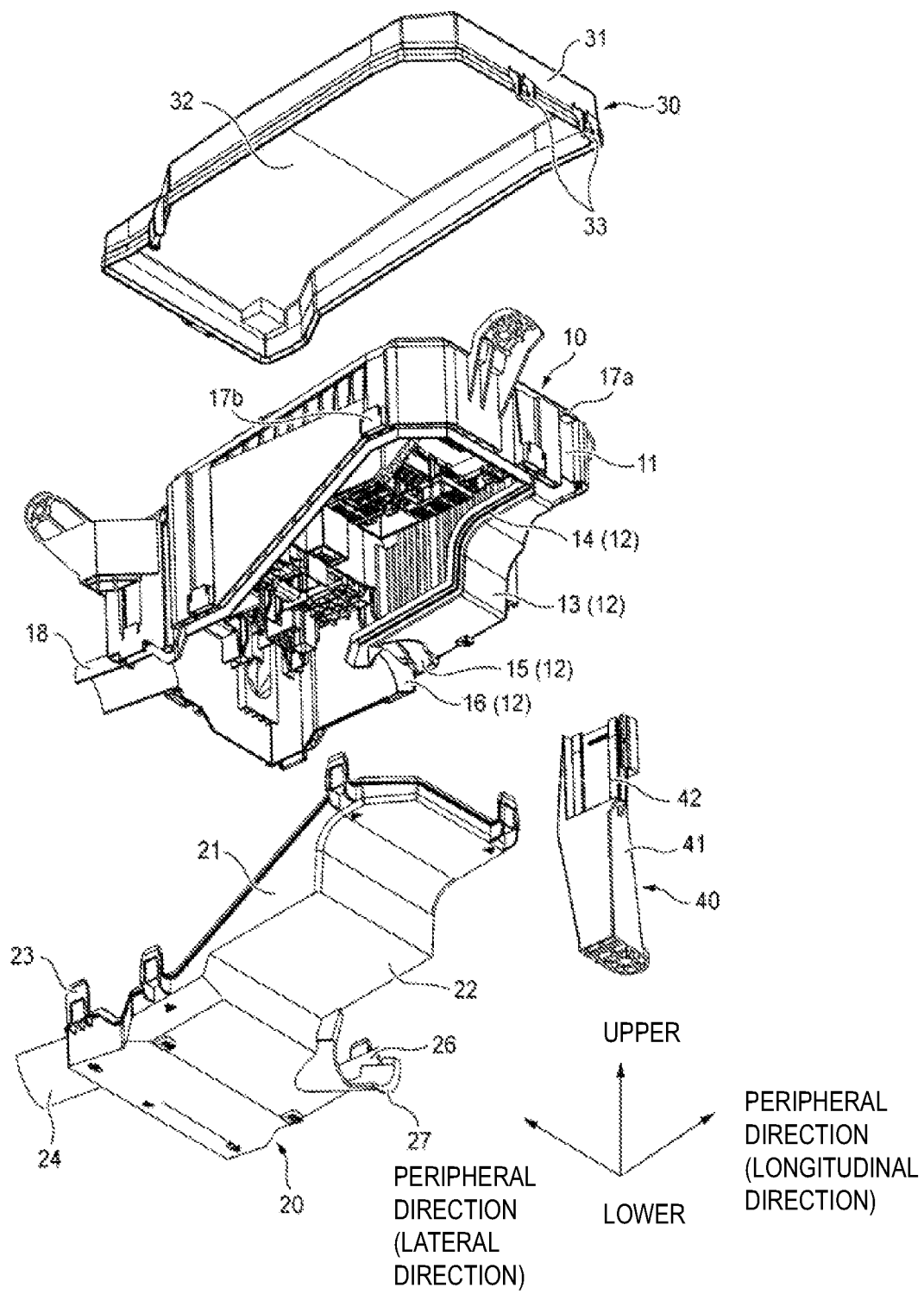
FIG. 2 is an exploded perspective view of the resin structure shown in FIG. 1.
Figure 3:
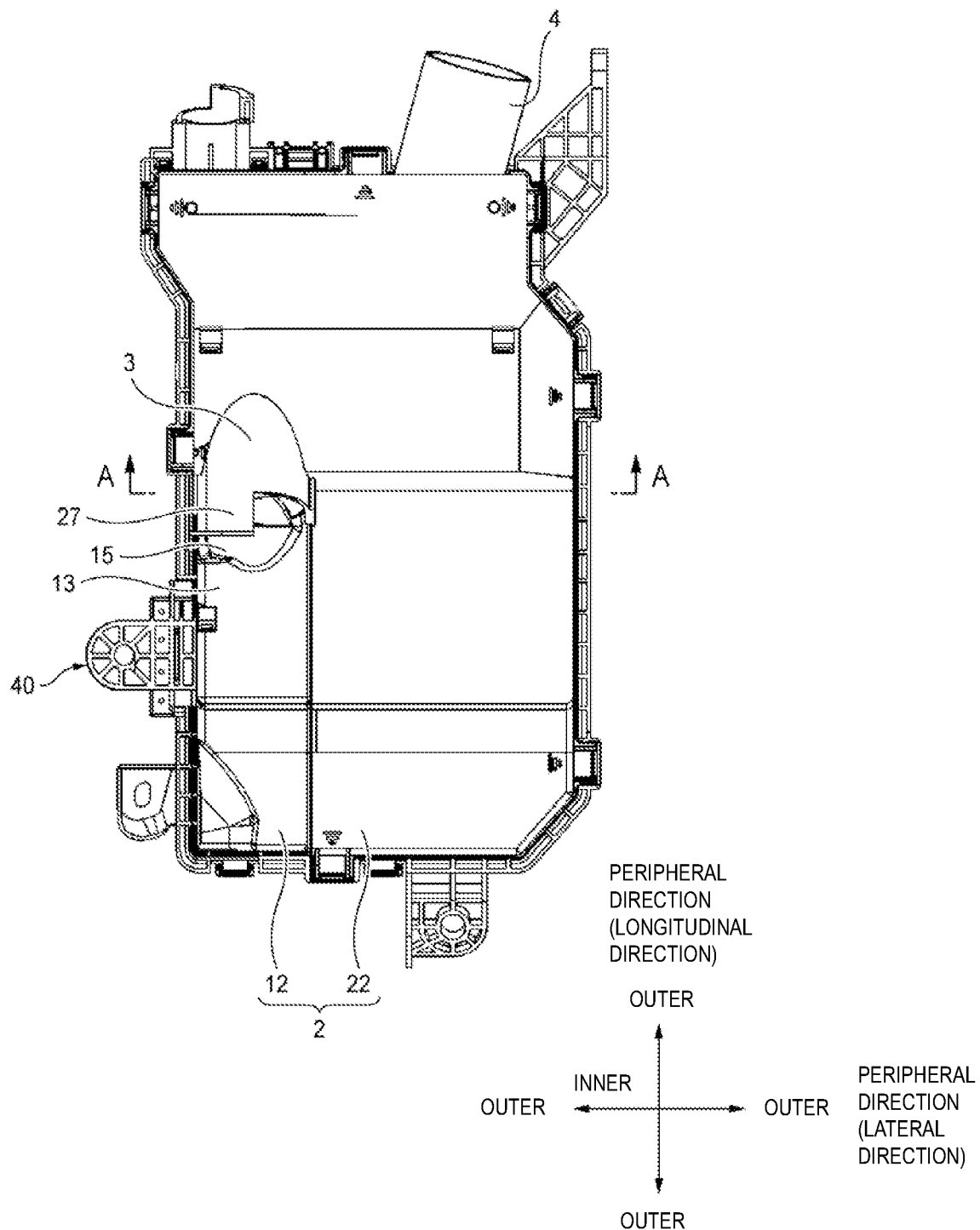
FIG. 3 is a front view of the resin structure shown in FIG. 1 as viewed from below.

As shown in FIGS. 1 and 2, the resin structure 1 includes a main body case 10, a lower cover 20, and an upper cover 30. Electronic components (and other components, not shown) such as relays are to be accommodated in the main body case 10. The lower cover 20 is to be attached to a lower end portion of the main body case 10 so as to close a lower end opening portion of the main body case 10, and the upper cover 30 is to be attached to an upper end portion of the main body case 10 so as to close an upper end opening portion of the main body case 10. The main body case 10, the lower cover 20, and the upper cover 30 together form the resin structure 1. The main body case 10 is also referred to as a "first resin body", and the lower cover 20 is also referred to as a "second resin body". A draw-out portion 3, which will be described later, is also referred to as an "insertion portion".

Hereinafter, for convenience of description, as shown in FIGS. 1 to 8, "upper-lower direction", "peripheral direction", "inner-outer direction", "up", "down", "inner", and "outer" are defined. The "upper-lower direction", the "peripheral direction", and the "inner-outer direction" are perpendicular to one another. When the main body case 10 and the lower cover 20, and the main body case 10 and the upper cover 30 are attached to each other, the "upper-lower direction" is along an attaching direction of the resin structure 1. In other words, the attaching direction is a direction in which the lower cover 20 or the upper cover 30 are attached to the main body case 10. The "peripheral direction" corresponds to a peripheral direction of a peripheral wall 11 (described later) of the main body case 10 and a peripheral wall 21 (described later) of the lower cover 20, and the "inner-outer direction" corresponds to a thickness direction of the peripheral wall 11 and the peripheral wall 21. The "inner-outer direction" also corresponds to a radial direction of the resin structure. Hereinafter, each member forming the resin structure 1 will be described in order.

First, the main body case 10 will be described. As shown in FIG. 2, the main body case 10 integrally includes the peripheral wall 11 extending in the upper-lower direction and having a substantially rectangular cylindrical shape and a bottom wall 12 to form, together with a bottom wall 22 of the lower cover 20 to be described later, a bottom wall 2 of the resin structure 1.

On an outer surface of an upper end edge portion of the peripheral wall 11 which has a substantially rectangular frame shape, first engaging portions 17a are provided at a plurality of positions (four positions in the present example, including not shown one) in the peripheral direction. In an attached state of the main body case 10 and the upper cover 30 (see FIG. 1), the plurality of first engaging portions 17a are respectively engaged with a plurality of engaging portions 33, which will be described later, provided on the upper cover. Further, on an outer surface of a lower end edge portion, second engaging portions 17b are respectively provided at a plurality of positions (seven positions in the present example including not shown ones) in the peripheral direction. In the attached state of the main body case 10 and the lower cover 20 (see FIG. 1), the plurality of second engaging portions 17b are respectively engaged with a plurality of engaging portions 23, which will be described later, provided on the lower cover 20.

As shown in FIGS. 1 and 2, the outer surface of the lower end edge portion of the peripheral wall 11 is provided with a first draw-in portion 18 having a substantially semi-cylindrical shape that extends along a longitudinal direction of the main body case 10 which is along the peripheral direction and is recessed upward in an arc shape. The first draw-in portion 18 forms, together with a second draw-in portion 24 of the lower cover 20 to be described later, a draw-in portion 4 having a substantially cylindrical shape that opens toward the outside of the resin structure 1.

Figure 4:
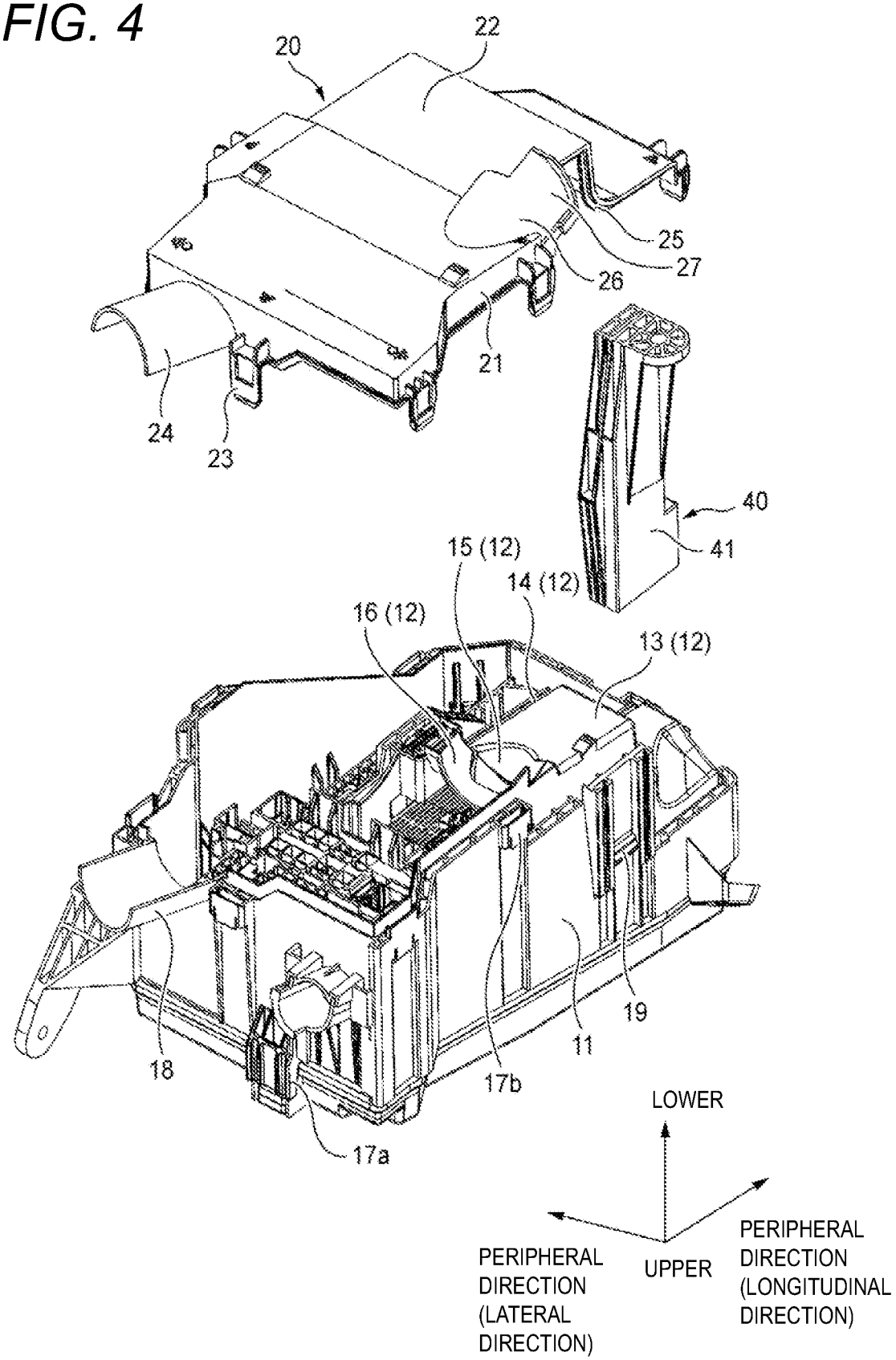
FIG. 4 is an exploded perspective view in which directions of the main body case and the lower cover are turned upside down.

As shown in FIG. 4, a third engaging portion 19 is provided on the outer surface of the peripheral wall 11. The third engaging portion 19 is to be engaged with an engaging portion 42 of a vehicle fixture 40 to be described later, and the vehicle fixture 40 is to be attached to the main body case 10.

As shown in FIG. 2, the bottom wall 12 includes an extension portion 13, an engagement recess 14, a first guide portion 15, and a first draw-out portion 16. The extension portion 13 has a predetermined length along a lateral direction of the main body case 10 which is along the peripheral direction, the lateral direction being perpendicular to the longitudinal direction, and extends from the lower end edge of the peripheral wall 11, for a predetermined distance along the longitudinal direction, protruding from the lower end edge of the peripheral wall 11 orthogonally to the lower end edge. As shown in FIGS. 1 and 2, the extension portion 13 extends in the upper-lower direction while being inclined from a certain position in the upper-lower direction.

As shown in FIG. 2, the engagement recess 14 is a recessed portion that is provided continuously with the extension portion 13, extends along the extension portion 13, and is recessed upward. The engagement recess 14 is provided with a recessed portion 14a, and has a shape corresponding to a protruding portion 25a of an engagement protrusion 25 to be described later. The engagement recess 14 further includes a wall portion 14b facing the recessed portion 14a and a bottom wall 14c continuous with a wall portion including the recessed portion 14a and the wall portion 14b.

The first guide portion 15 is located between the extension portion 13 and the first draw-out portion 16, is recessed upward with a curved surface with respect to the extension portion 13, and has a smooth shape along the lateral direction. The first guide portion 15 has an edge portion 15a and an edge portion 15b in the longitudinal direction (see FIGS. 7A and 7B).

Figure 5A:
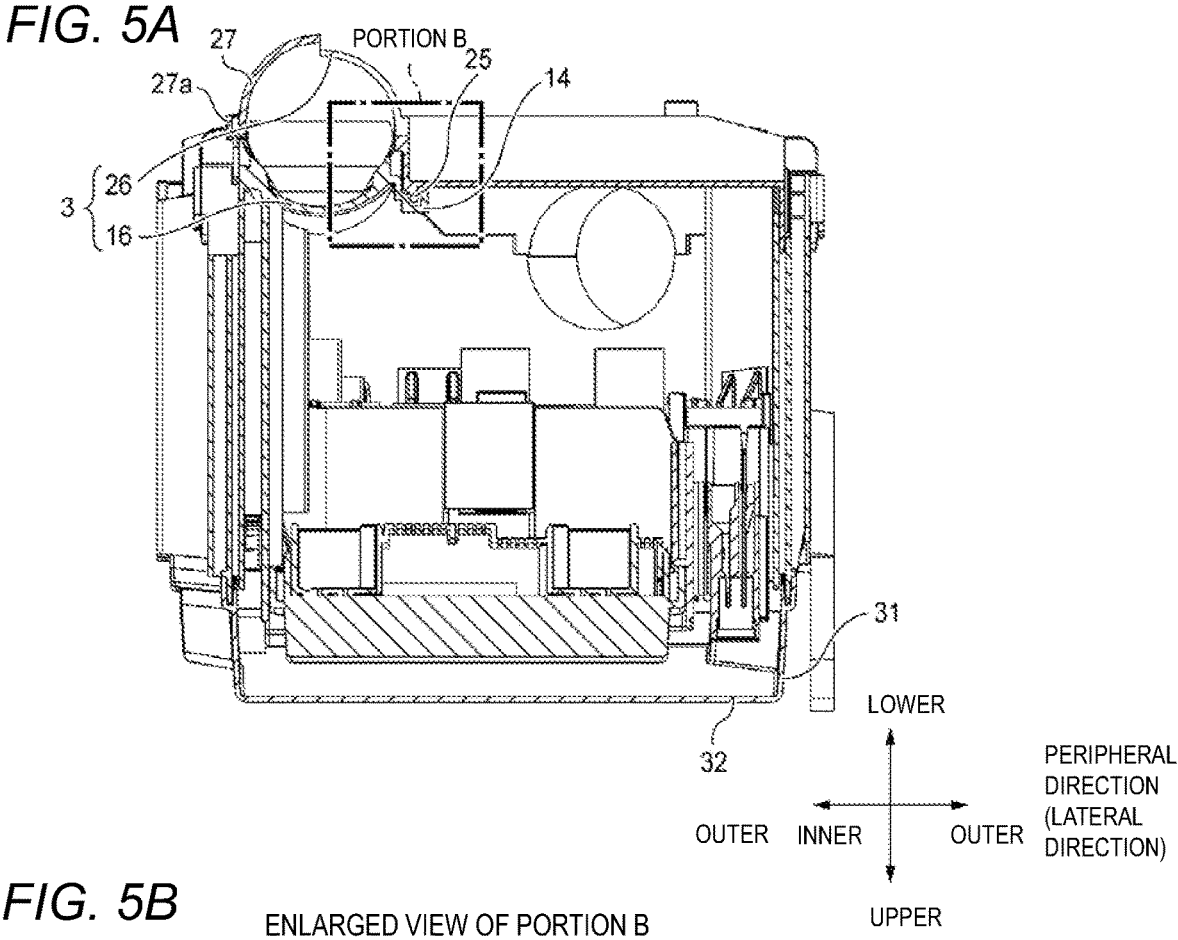
FIG. 5A is a cross-sectional view taken along a line A-A in FIG. 3.
Figure 5B:
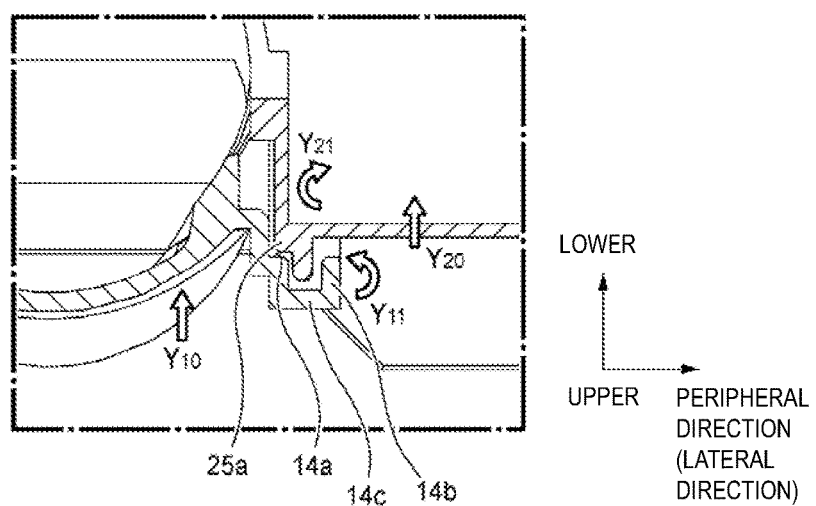
FIG. 5B is an enlarged view of a portion B in FIG. 5A (illustration of a vehicle fixture is omitted)

The first draw-out portion 16 is provided continuously with the first guide portion 15, and has a substantially semi-cylindrical shape that extends along the longitudinal direction and is recessed upward in an arc shape. As shown in FIGS. 5A and 5B, the first draw-out portion 16 and a second draw-out portion 26, which will be described later, form a draw-out portion 3 having a substantially cylindrical shape that opens toward the outside of the resin structure 1.

Next, the lower cover 20 will be described. As shown in FIG. 2, the lower cover 20 integrally includes the peripheral wall 21 extending in the upper-lower direction and the substantially rectangular flat plate-shaped bottom wall 22 that closes a lower end opening portion of the peripheral wall 21. The lower cover 20 is formed by cutting out the bottom wall 22 at a position corresponding to the bottom wall 12 of the main body case 10, and the peripheral wall 21 is not provided therein.

On the outer surface of the upper end edge portion of the peripheral wall 21, engaging portions 23 are provided at a plurality of positions (seven positions including not shown ones in the present example) in the peripheral direction corresponding to the plurality of second engaging portions 17b of the main body case 10.

As shown in FIGS. 1 to 4, the second draw-in portion 24 having a substantially semi-cylindrical shape that extends along the longitudinal direction and is recessed downward in an arc shape is provided at the upper end edge portion of the peripheral wall 21. The second draw-in portion 24 forms, together with the first draw-in portion 18 of the main body case 10, the draw-in portion 4 having a substantially cylindrical shape that opens toward the outside of the resin structure 1.

As shown in FIGS. 2 and 4, the bottom wall 22 includes the engagement protrusion 25, the second draw-out portion 26, and a second guide portion 27. The engagement protrusion 25 is a protrusion that is provided at a position corresponding to the engagement recess 14, extends along the longitudinal direction, and protrudes upward. The engagement protrusion 25 is provided with a protruding portion 25a protruding in the peripheral direction, and is to be inserted into the engagement recess 14 so as to face the recessed portion 14a of the engagement recess 14.

The second draw-out portion 26 is provided at a location corresponding to the first draw-out portion 16, and has a substantially semi-cylindrical shape that extends along the longitudinal direction and is recessed downward in an arc shape. As shown in FIGS. 5A and 5B, the second draw-out portion 26 forms, together with the first draw-out portion 16, the draw-out portion 3 having a substantially cylindrical shape that opens toward the outside of the resin structure 1.

The second guide portion 27 extends from a free end of the second draw-out portion 26 along the longitudinal direction in a state where a part of the second guide portion 27 is cut out. In the second guide portion 27, a hole portion 27a into which a tie band B to be described later is to be inserted is provided at an end edge on an opposite side to a cut side in the lateral direction, and a restraining portion 27b protruding downward is provided at an end edge in the longitudinal direction. The hole portion 27a is a hole penetrating in the upper-lower direction.

Next, the upper cover 30 will be described. As shown in FIG. 2, the upper cover 30 integrally includes a peripheral wall 31 extending in the upper-lower direction and a substantially rectangular flat plate-shaped upper wall 32 that closes an upper end opening portion of the peripheral wall 31. On an outer surface of a lower end edge portion of the peripheral wall 31, engaging portions 33 are provided at a plurality of positions (four positions including not shown ones in the present example) in the peripheral direction corresponding to the plurality of first engaging portions 17a of the main body case 10.

Next, the vehicle fixture 40 will be described. The resin structure 1 according to the embodiment of the present invention further includes the vehicle fixture 40. As shown in FIGS. 2 and 4, the vehicle fixture 40 is provided with a peripheral wall 41 extending in the upper-lower direction, and an engaging portion 42 on an outer surface of the peripheral wall 41 at a position corresponding to the third engaging portion 19 of the main body case 10. The vehicle fixture 40 is provided as a separate member from the main body case 10, and is configured to prevent displacement of the resin structure 1 with respect to the vehicle when the resin structure 1 is mounted on the vehicle.

In the resin structure 1, since the main body case 10 and the vehicle fixture 40 are provided as separate members, the degree of freedom in designing the vehicle fixture 40 is improved. Therefore, in the resin structure 1 according to the present embodiment, the vehicle fixture 40 is designed to have a structure with high strength. As a result, in the resin structure 1, the strength of the resin structure 1 can be increased by attaching the vehicle fixture 40 having high strength to the main body case 10.

Next, a wire harness WH according to the embodiment of the present invention will be described. In the resin structure 1, an electric wire W1 is drawn into the resin structure 1, and an electric wire W2 branched from the electric wire W1 is to be electrically connected to an electronic component and an electric wire (not shown) accommodated in the resin structure 1, and the electric wire W1 is drawn out from the inside to the outside of the resin structure 1. The resin structure 1 and the electric wires W1 and W2 are parts of the wire harness WH.

Figure 6:
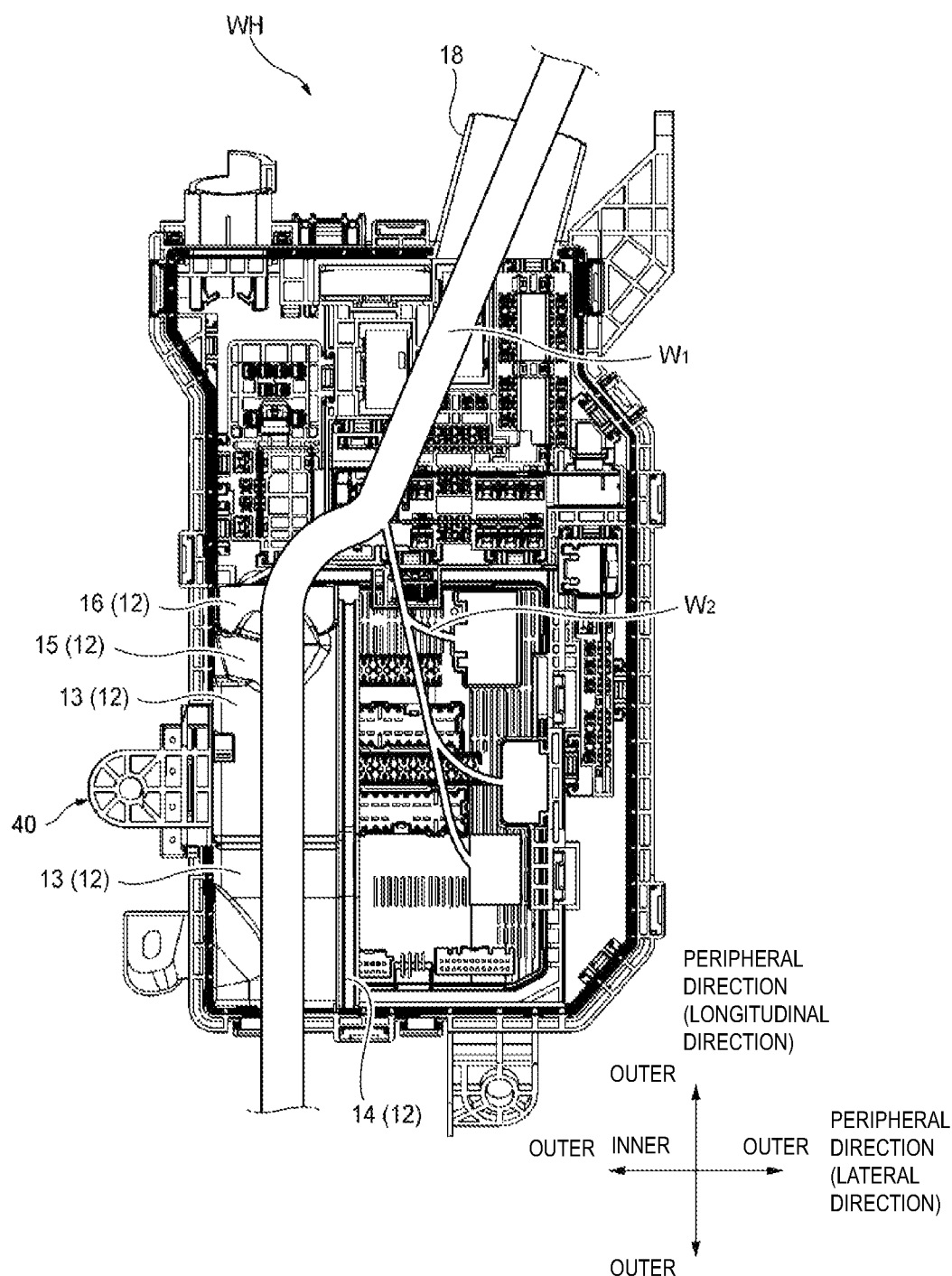
FIG. 6 is a front view of a wire harness according to the embodiment of the present invention as viewed from below (a lower cover is not shown)

As shown in FIG. 6, the electric wire W1 to be drawn into the resin structure 1 is placed on the first draw-in portion 18 of the main body case 10. In addition, inside the resin structure 1, the electric wire W2 is electrically connected to a predetermined electronic component and an electric wire (not shown) via a connector or the like. Then, the electric wires W1 and W2 that have passed through the inside of the resin structure 1 are placed on the first draw-out portion 16.

As described above, when the routing of the electric wires W1 and W2 is completed, the lower cover 20 is attached to the main body case 10. At this time, since the main body case 10 has the bottom wall 12, the electric wire W1 can be placed on the bottom wall 12, and thus the electric wire can be guided in any direction by the extension portion 13 (that is, the electric wire W1 can be routed along the extension portion 13). Accordingly, the electric wires W1, W2 can be drawn out in any direction by the main body case 10 and the lower cover 20 without guiding the electric wires W1, W2 by providing an additional guide portion as in a wire harness of related art. In other words, in the wire harness WH according to the present embodiment, a direction in which the electric wire W1 is drawn into the resin structure 1 from the draw-in portion 4 and a direction in which the electric wire W1 is drawn out of the resin structure 1 through the draw-out portion 3 are substantially parallel to each other, and the electric wire W1 is drawn out from the resin structure 1 to the outside along the peripheral direction.

After the work described above is completed (that is, in the attached state of the main body case 10 and the lower cover 20), the electric wire W1 placed on the first draw-in portion 18 is guided in any direction while being covered by the draw-in portion 4 formed by the first draw-out portion 18 and the second draw-in portion 24. Similarly, the electric wire W1 placed on the first draw-out portion 16 is guided in any direction while being covered by the draw-out portion 3 formed by the first draw-out portion 16 and the second draw-out portion 26. Thereafter, as shown in FIG. 7B, the draw-out portion 3 and the electric wire W1 drawn out from the draw-out portion 3 are integrally wound using the tie band B.

Figure 7A:
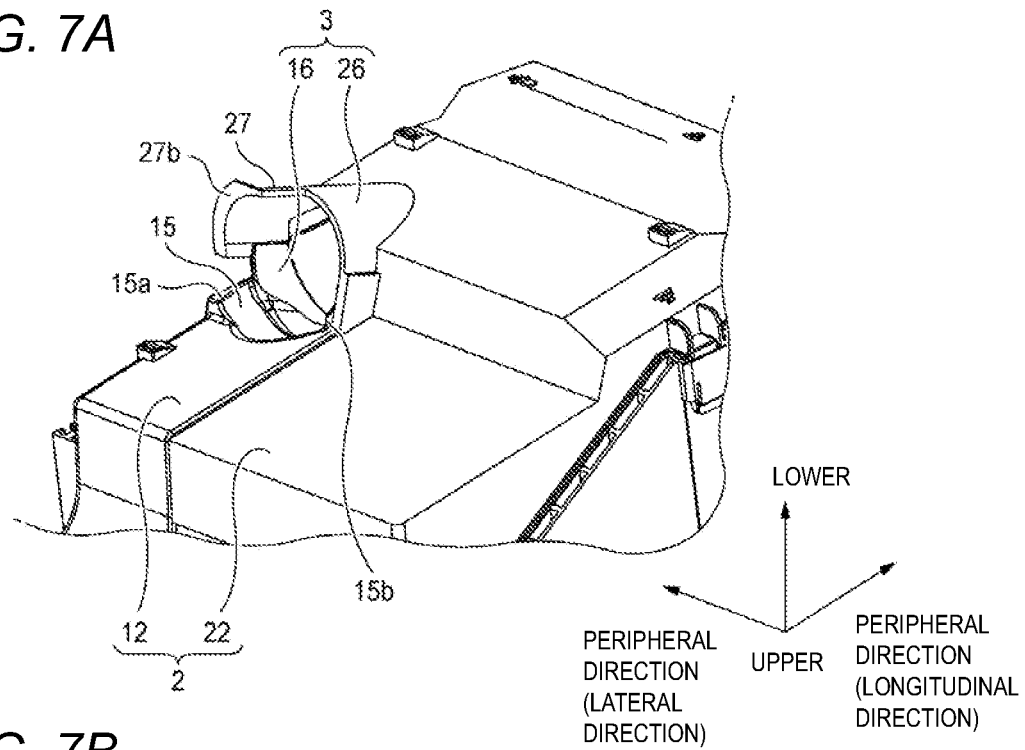
FIG. 7A is an enlarged perspective view showing a draw-out portion of the resin structure in FIG. 1.

Next, the winding operation of the tie band B described above will be described. As shown in FIGS. 7A to 8, an operator inserts one end portion of the tie band B into the hole portion 27a along an arrow Y3 (that is, from a lower side to an upper side). The one end portion of the tie band B inserted into the hole portion 27a passes by the edge portion 15a and enters the first guide portion 15. When the insertion of the tie band B is further continued, the one end portion is guided along a curved surface of the first guide portion, passes by the edge portion 15b, and goes downward.

Figure 7B:
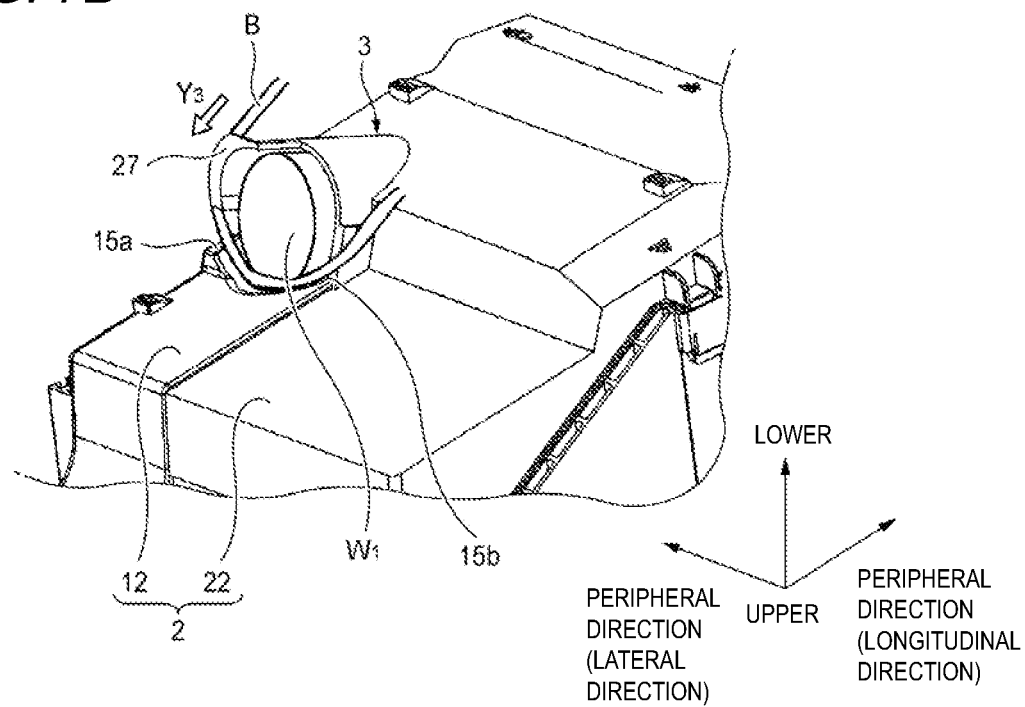
FIG. 7B is a view showing a step of winding an electric wire with a tie band in FIG. 7A (illustration of the vehicle fixture is omitted)
Figure 8:
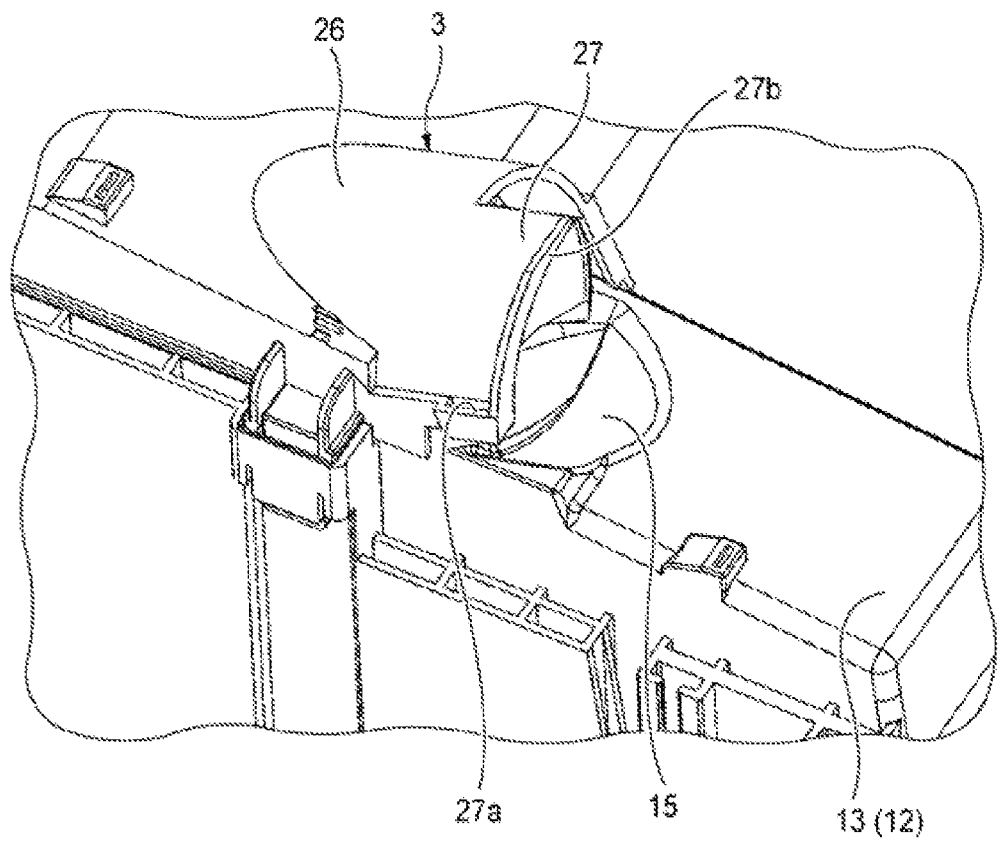
FIG. 8 is an enlarged perspective view of the draw-out portion as viewed from an angle different from that of FIG. 7A (illustration of the vehicle fixture is omitted).
Figure 8:
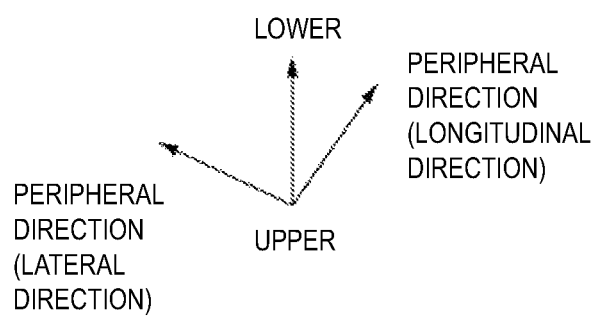

As described above, the tie band B inserted into the hole portion 27a is guided by the first guide portion 15 and has a substantially U-shape as shown in FIG. 7B. Thereafter, the operator grips the one end portion of the tie band B guided by the first guide portion 15, and binds the end portions on the one side and the other side with each other via a fastener provided on the other side. After the tie band B is wound, the restraining portion 27b prevents the tie band B from escaping toward an opening end side of the draw-out portion 3.

As described above, since the resin structure 1 includes the first guide portion 15 and the one end portion of the tie band B is inserted into the hole portion 27a, the one end portion is naturally guided downward (toward the operator), and thus the winding operation is facilitated. That is, since the tie band B is inserted into the hole portion 27a and the tie band B is wound around the electric wire W1 so as to run along the electric wire W1, the number of steps of manually winding the tie band B along the electric wire W1 by the operator is reduced. As a result, the workability of the resin structure 1 according to the present embodiment is improved compared to a resin structure of related art (electrical junction box).

The edge portion 15a is designed at a position where the tie band B inserted into the hole portion 27a can enter the first guide portion 15. In addition, since the second guide portion 27 extends along the longitudinal direction in a state where a part of the second guide portion 27 is cut out, the second guide portion 27 does not interfere with the tie band B moving downward after passing by the edge portion 15b.

Next, the main body case 10, the lower cover 20, and an opening prevention structure in the bottom wall 2 will be described. The opening prevention structure includes the engagement recess 14 and the engagement protrusion 25, and is a structure that prevents the engagement between the bottom wall 12 and the bottom wall 22 from being released. Specifically, the engagement protrusion 25 is inserted into the engagement recess 14 such that the protruding portion 25a faces the recessed portion 14a of the engagement recess 14 (that is, the opening prevention structure has a so-called labyrinth structure).

As shown in FIG. 5B, as described above, in the resin structure 1 in which the electric wires W1 and W2 are inserted, loads from the electric wires W1 and W2 may be applied to the bottom wall 12 of the main body case 10 and the bottom wall 22 of the lower cover 20, respectively. Specifically, since the electric wires W1 and W2 are placed on the bottom wall 2 inside the resin structure 1, the load described above is applied to the bottom wall 12 and the bottom wall 22 due to the weight of the electric wires W1 and W2, the slight vibration of the resin structure 1 mounted on the vehicle, or the like. In particular, a load is applied to the main body case 10 from the electric wires W1 and W2 in a direction of an arrow Y10, and a load is applied to the lower cover 20 from the electric wires W1 and W2 in a direction of an arrow Y20.

The opening prevention structure prevents the displacement of the main body case 10 in a rotation direction (direction of an arrow Y11) by which the attached state with the lower cover 20 is released due to the load in the direction of the arrow Y10. That is, in the opening prevention structure, when a force is generated in the direction of the arrow Y11, a lower end portion of the wall portion 14b interferes with the bottom wall 22, so that the attached state of the main body case 10 and the lower cover 20 is prevented from being released.

Similarly, the opening prevention structure prevents the displacement of the lower cover 20 in a rotation direction (direction of an arrow Y21) by which the attached state with the main body case 10 is released due to the load in the direction of the arrow Y20. That is, in the opening prevention structure, when a force is generated in the direction of the arrow Y21, the wall portion having the protruding portion 25a of the engagement protrusion 25 interferes with the wall portion having the recessed portion 14a of the engagement recess 14, and thus the attached state of the main body case 10 and the lower cover 20 is prevented from being released.

According to the resin structure 1 of the present embodiment, the main body case 10 includes the bottom wall 12 and the first draw-out portion 16, and the lower cover 20 includes the bottom wall 22 and the second draw-out portion 26. The bottom wall 2 includes the bottom wall 12 and the bottom wall 22, and the draw-out portion 3 is provided on the bottom wall 2 and includes the first draw-out portion 16 and the second draw-out portion 26. That is, since the draw-out portion 3 of the resin structure 1 includes the main body case 10 and the lower cover 20, the draw-out portion 3 can be opened in any direction in the bottom wall 2 without attaching an additional guide portion as in the resin structure of related art by determining an opening direction of the draw-out portion 3 as desired. As a result, the resin structure 1 according to the present embodiment can draw out the electric wires W1 and W2 in any direction while reducing the number of components.

Further, the engagement protrusion 25 is provided on the edge portion of the bottom wall 22 of the lower cover 20, and the engagement recess 14 is provided on the edge portion of the bottom wall 12 of the main body case 10. The edge portions of the main body case 10 and the lower cover 20 are engagement portions of the bottom wall 2, and the edge portions of both the main body case 10 and the lower cover 20 described above are engaged with each other by inserting the engagement protrusion 25 into the engagement recess 14. Since the engagement portion has such a recess-protrusion fitting structure, the main body case 10 and the lower cover 20 are prevented from being separated from each other (that is, the engagement portion is prevented from being opened) even when an external force is applied to the bottom wall 2 on which the draw-out portion 3 is disposed. In other words, the bottom wall 2 of the resin structure 1 is formed by the main body case 10 and the lower cover 20 by the engagement protrusion 25 and the engagement recess 14 being engaged with each other. Therefore, in the resin structure 1 according to the present embodiment, the separation of both edge portions described above is prevented by a simple structure in which the engagement recess 14 is inserted into the engagement protrusion 25 without providing a lock structure (specifically, a structure for maintaining the attached state of the main body case and the lower cover in the resin structure of related art) at the engagement portion.

Further, the engagement protrusion 25 has the protruding portion 25a protruding in a direction different from the protruding direction of the engagement protrusion 25, and the engagement recess 14 has the recessed portion 14a recessed so as to correspond to the protruding portion 25a. When the main body case 10 and the lower cover 20 are engaged with each other, the protruding portion 25a is fitted into the recessed portion 14a (a so-called labyrinth structure). Since the engagement portion has the labyrinth structure as described above, the separation of the main body case 10 and the lower cover 20 (that is, opening of the engagement portion) is more appropriately prevented even when an external force is applied to the bottom wall 2 on which the draw-out portion 3 is disposed. Further, in the resin structure 1 according to the present embodiment, the structure (so-called labyrinth structure) described above prevents the entry of water into the resin structure 1 from the engagement portion, as compared with the case where the lock structure is provided in the engagement portion.

According to the wire harness WH of the present embodiment, the main body case 10 includes the bottom wall 12 and the first draw-out portion 16, and the lower cover 20 includes the bottom wall 22 and the second draw-out portion 26. The bottom wall 2 includes the bottom wall 12 and the bottom wall 22, and the draw-out portion 3 is provided on the bottom wall 2 and includes the first draw-out portion 16 and the second draw-out portion 26. That is, since the draw-out portion 3 of the resin structure 1 is formed by the main body case 10 and the lower cover 20, the electric wires W1 and W2 can be inserted into and drawn out of the resin structure 1 in any direction in the bottom wall 2 without attaching an additional guide part as in the resin structure of related art by setting the opening direction of the draw-out portion 3 to be a desired direction. As a result, the wire harness WH according to the present embodiment can draw out the electric wires W1 and W2 in any direction while reducing the number of components.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to an aspect of the embodiments described above, a resin structure (1) has an insertion portion (for example, a draw-out portion 3) configured such that an electric wire (W1, W2) runs through the insertion portion to extend inside and outside the resin structure. The resin structure (1) includes a first resin body (for example, a main body case 10) having a box shape and an opening portion and a second resin body (for example, a lower cover 20) configured to be attached to the first resin body in an attaching direction so as to cover the opening portion. The first resin body (for example, the main body case 10) includes a first wall portion (for example, a bottom wall 12) forming a part of a wall portion (for example, a bottom wall 2) perpendicular to the attaching direction, and a first insertion portion (for example, a first draw-out portion 16) provided in the first wall portion and forming a part of the insertion portion (for example, the draw-out portion 3). The second resin body (for example, the lower cover 20) includes a second wall portion (for example, a bottom wall 22) forming another part of the wall portion (for example, the bottom wall 2), and a second insertion portion (for example, a second draw-out portion 26) provided in the second wall portion and forming another portion of the insertion portion (for example, the draw-out portion 3). When the first resin body (for example, the main body case 10) and the second resin body (for example, the lower cover 20) are attached to each other, the insertion portion (for example, the draw-out portion 3) is disposed in the wall portion (for example, the bottom wall 2) of the resin structure (1).

According to the resin structure having the above configuration, the first resin body includes the first wall portion and the first insertion portion provided in the first wall portion, and the second resin body includes the second wall portion and the second insertion portion provided in the second wall portion. The wall portion of the resin structure includes the first wall portion and the second wall portion, and the insertion portion of the resin structure is provided in the wall portion and includes the first insertion portion and the second insertion portion. That is, since the insertion portion of the resin structure includes the first resin body and the second resin body, the insertion portion can be opened in any direction in the wall portion without attaching an additional guide portion as in a resin structure of related art by setting the opening direction of the insertion portion as desired. As a result, in the resin structure according to the present configuration, it is possible to draw out the electric wire in any direction while reducing the number of components.

One (for example, the lower cover 20) of the first resin body (for example, the main body case 10) and the second resin body (for example, the lower cover 20) may have an engagement protrusion (25) at an edge portion of the one of the first resin body and the second resin body. The other one (for example, the main body case 10) of the first resin body (for example, the main body case 10) and the second resin body (for example, the lower cover 20) may have an engagement recess (14) at an edge portion of the other one. The first resin body (for example, the main body case 10) and the second resin body (for example, the lower cover 20) may be configured to be engaged with each other by the engagement protrusion (25) being inserted into the engagement recess (14).

With this configuration, the engagement protrusion is provided at one edge portion of the first resin body and the second resin body, and the engagement recess is provided at the other edge portion of the first resin body and the second resin body. The one edge portion and the other edge portion are engagement portions of the wall portion, and the one edge portion and the other edge portion are engaged with each other when the engagement protrusion is inserted into the engagement recess. Since the engagement portion has such a recess-protrusion fitting structure, the first resin body and the second resin body are prevented from being separated from each other (that is, the engagement portion is prevented from being opened) even when an external force is applied to the wall portion on which the insertion portion is disposed. In other words, the wall portion of the resin structure includes the first resin body and the second resin body by the engagement of the engagement protrusion and the engagement recess. Therefore, in the resin structure according to the present configuration, separation of the one edge portion and the other edge portion described above is prevented by a simple structure in which the engagement recess is inserted into the engagement protrusion without providing a lock structure (specifically, a structure for maintaining an attached state of the first resin body and the second resin body in the resin structure of related art) in the engagement portion.

The engagement protrusion (25) may include a protruding portion (25a) protruding in a second direction different from a first direction in which the engagement protrusion protrudes. The engagement recess (14) may include a recessed portion (14a) recessed so as to correspond to the protruding portion (25a). The protruding portion (25a) may be configured to, when the first resin body (for example, the main body case 10) and the second resin body (for example, the lower cover 20) are engaged with each other, be fitted into the recessed portion (14a).

With this configuration, the engagement protrusion has a protruding portion protruding in a direction different from the protruding direction, and the engagement recess has a recessed portion recessed so as to correspond to the protruding portion. When the first resin body and the second resin body are engaged with each other, the protruding portion is fitted into the recessed portion (a so-called labyrinth structure). Since the engagement portion has the labyrinth structure as described above, separation of the first resin body and the second resin body (that is, opening of the engagement portion) is more appropriately prevented even when an external force is applied to the wall portion in which the insertion portion is disposed. Furthermore, in the resin structure according to the present configuration, entry of water into the resin structure from the engagement portion is prevented by the structure (so-called labyrinth structure) described above as compared with a case where a lock structure is provided in the engagement portion.

According to another aspect of the embodiments described above, a wire harness (WH) includes a resin structure (1) and an electric wire (W1, W2) to be inserted into and run through the resin structure (1). The resin structure (1) includes an insertion portion (for example, a draw-out portion 3) through which the electric wire runs to extend inside and outside the resin structure (1), a first resin body (for example, a main body case 10) having a box shape and an opening portion; and a second resin body (for example, a lower cover 20) configured to be attached to the first resin body in an attaching direction so as to cover the opening portion. The first resin body (for example, the main body case 10) includes a first wall portion (for example, a bottom wall 12) forming a part of a wall portion (for example, a bottom wall 2) perpendicular to the attaching direction, and a first insertion portion (for example, a first draw-out portion 16) provided in the first wall portion and forming a part of the insertion portion (for example, the draw-out portion 3). The second resin body (for example, the lower cover 20) includes a second wall portion (for example, a bottom wall 22) forming another portion of the wall portion, and a second insertion portion (for example, a second draw-out portion 26) provided in the second wall portion and forming another portion of the insertion portion. When the first resin body (for example, the main body case 10) and the second resin body (for example, the lower cover 20) are attached to each other, the insertion portion (for example, the draw-out portion 3) is disposed in the wall portion (for example, the bottom wall 2) of the resin structure (1). The electric wire (W1, W2) runs through the insertion portion (for example, the draw-out portion 3) to extend inside and outside the resin structure (1).

According to the wire harness having the above configuration, the first resin body includes the first wall portion and the first insertion portion provided in the first wall portion, and the second resin body includes the second wall portion and the second insertion portion provided in the second wall portion. The wall portion of the resin structure includes the first wall portion and the second wall portion, and the insertion portion of the resin structure is provided in the wall portion and includes the first insertion portion and the second insertion portion. That is, since the insertion portion of the resin structure includes the first resin body and the second resin body, the electric wire can be inserted into and drawn out of the resin structure in any direction in the wall portion without attaching an additional guide portion as in the wire harness (resin structure) of related art by determining an opening direction of the insertion portion in a desired direction. As a result, in the wire harness according to the present configuration, the electric wire can be drawn out in any direction while reducing the number of components.

What is claimed is:

1. A resin structure having an insertion portion configured such that an electric wire runs through the insertion portion to extend inside and outside the resin structure, the resin structure comprising:
a first resin body having a box shape and an opening portion; and
a second resin body configured to be attached to the first resin body in an attaching direction so as to cover the opening portion,
wherein the first resin body includes a first wall portion forming a part of a wall portion perpendicular to the attaching direction, and a first insertion portion provided in the first wall portion and forming a part of the insertion portion,
wherein the second resin body includes a second wall portion forming another part of the wall portion, and a second insertion portion provided in the second wall portion and forming another portion of the insertion portion,
wherein, when the first resin body and the second resin body are attached to each other, the insertion portion is disposed in the wall portion of the resin structure,
wherein one of the first resin body and the second resin body has an engagement protrusion at an edge portion of the one of the first resin body and the second resin body, and
wherein the other one of the first resin body and the second resin body has an engagement recess at an edge portion of the other one, and
wherein the first resin body and the second resin body are configured to be engaged with each other by the engagement protrusion being inserted into the engagement recess.

2. The resin structure according to claim 1,
wherein the engagement protrusion includes a protruding portion protruding in a second direction different from a first direction in which the engagement protrusion protrudes,
wherein the engagement recess includes a recessed portion recessed so as to correspond to the protruding portion, and
wherein the protruding portion is configured to, when the first resin body and the second resin body are engaged with each other, be fitted into the recessed portion.

3. A wire harness comprising:
a resin structure; and
an electric wire to be inserted into and run through the resin structure,
wherein the resin structure includes an insertion portion through which the electric wire runs to extend inside and outside the resin structure, a first resin body having a box shape and an opening portion; and a second resin body configured to be attached to the first resin body in an attaching direction so as to cover the opening portion,
wherein the first resin body includes a first wall portion forming a part of a wall portion perpendicular to the attaching direction, and a first insertion portion provided in the first wall portion and forming a part of the insertion portion,
wherein the second resin body includes a second wall portion forming another portion of the wall portion, and a second insertion portion provided in the second wall portion and forming another portion of the insertion portion,
wherein, when the first resin body and the second resin body are attached to each other, the insertion portion is disposed in the wall portion of the resin structure,
wherein the electric wire runs through the insertion portion to extend inside and outside the resin structure,
wherein one of the first resin body and the second resin body has an engagement protrusion at an edge portion of the one of the first resin body and the second resin body, and
wherein the other one of the first resin body and the second resin body has an engagement recess at an edge portion of the other one, and wherein the first resin body and the second resin body are configured to be engaged with each other by the engagement protrusion being inserted into the engagement recess.

* * * * *